(12) United States Patent
Han et al.

(10) Patent No.: US 7,235,594 B2
(45) Date of Patent: Jun. 26, 2007

(54) BIODEGRADABLE PLASTIC COMPOSITION

(75) Inventors: Kyu-Teck Han, Seoul (KR); Jung-Hoon Choi, Seoul (KR); Ik-Soo Chung, Daejeon (KR)

(73) Assignee: Biorepla Corporation, Seoul (KR)

( * ) Notice: Subject to any disclaimer, the term of this patent is extended or adjusted under 35 U.S.C. 154(b) by 460 days.

(21) Appl. No.: 10/482,676

(22) PCT Filed: Jul. 12, 2002

(86) PCT No.: PCT/KR02/01325

§ 371 (c)(1),
(2), (4) Date: Dec. 31, 2003

(87) PCT Pub. No.: WO03/006545

PCT Pub. Date: Jan. 23, 2003

(65) Prior Publication Data

US 2004/0167247 A1   Aug. 26, 2004

(30) Foreign Application Priority Data

Jul. 13, 2001 (KR) ............... 2001-42484
Feb. 1, 2002 (KR) ............... 2002-5809

(51) Int. Cl.
*C08L 3/00* (2006.01)
*C08K 5/098* (2006.01)

(52) U.S. Cl. ............... 523/124; 523/126; 523/128; 524/47; 524/394

(58) Field of Classification Search ............... 523/124, 523/126, 128
See application file for complete search history.

(56) References Cited

U.S. PATENT DOCUMENTS 3,533,768 A * 10/1970 Wong et al. ............... 65/448
3,870,547 A * 3/1975 Workman et al. ............ 427/206
4,021,388 A * 5/1977 Griffin ........................ 523/128
4,133,784 A    1/1979 Otey et al. .................. 523/128
4,337,181 A    6/1982 Otey et al. .................. 523/128
5,824,462 A * 10/1998 Ashida et al. .............. 430/531
6,027,770 A *  2/2000 Yoshino ..................... 427/444

FOREIGN PATENT DOCUMENTS

| JP | 03027109 A | * | 2/1991 |
| JP | 05345838 A | * | 12/1993 |
| KR | 1998-0072370 | | 11/1998 |
| KR | 2000-0006774 | | 2/2000 |
| KR | 2001-0055066 | | 7/2001 |
| KR | 2001-0074465 | | 8/2001 |

* cited by examiner

*Primary Examiner*—Tae H Yoon
(74) *Attorney, Agent, or Firm*—Jones Day

(57) ABSTRACT

The present invention relates to biodegradable plastic composition comprising rice powder and/or corn powder, which can be characterized in comprising 100 parts by weight of polyolefin matrix resin; 5 to 400 parts by weight of grain powder selected from the group consisting of rice powder, corn powder and mixture thereof. The biodegradable plastic composition according to the present invention can be manufactured in various forms such as injection molding product, sheet molding and blow molding product, which have excellent physical properties and product stability. The efficiency of waste disposable of the product manufactured with the composition can be remarkably improved since the rive powder or the corn powder contained in the composition can be degraded by microbes in the nature after a certain period. Therefore, the problems of soil, air, and sea pollution caused by burial or incineration of the wastes of conventional plastic molding product can be minimized.

5 Claims, No Drawings

BIODEGRADABLE PLASTIC COMPOSITION

BACKGROUND OF THE INVENTION (a) Field of the Invention

The present invention relates to biodegradable plastic composition. More particularly, it relates to a material composition for plastic molded article, which not only can be molded into various products having good physical properties and safety, but also can minimize the environmental problems of soil, air, and sea pollution caused by burial or incineration of wastes of the product because the inventive material comprises natural materials, i.e., rice powder and/or corn powder, and the waste of the products made from the composition can be degraded by microbes in the natural world after a certain period.

(b) Description of the Related Art

Synthetic polymer represented by plastic is one of materials necessary for convenient and comfortable present-day life along with metal and ceramic. Such synthetic polymer is used for products of various industry fields such as daily life material, construction, medical service, agriculture, etc., and the amount of use is remarkably increasing. However, contrary to natural polymer, most of synthetic polymer is not easily decomposed, so the disposal and management of wastes of synthetic polymer products are big social problems for all the countries over the world.

Such plastic wastes are treated by the conventional methods such as recycling, incineration and burial. But especially, the recycled articles have restrictions in their uses, and have many problems of high cost and air pollution that take place while recycling, so many researches about degradable plastic to solve above-mentioned problems fundamentally are on being developed actively at all the countries over the world.

The technology concerned with degradable plastic can be classified into three groups, i.e., photolysis technology, biodegradation technology and photo-biodegradation technology.

And the photolysis technology can be further classified into two types, i.e., introduction of photosensitive functional group and addition of photosensitive reagent. The types introducing photosensitive functional group were developed by the Dow Chemical Company which commercializes a copolymer of ethylene with carbon monoxide, and by Union Carbide Corporation, and by Bayer Corporation. And, the type adding metal complex compound developed by Scott-Gilead was a main stream of the type adding photosensitive reagent, and Ampacet Corporation and Ideamasters Corporation also commercialized this type of material. But, these photolyzable products have problems in that the production cost is high, and when being buried in the soil, they couldn't be degraded because the sunlight is blocked and accordingly they cannot absorb the photo energy. Therefore, the plastic waste problem cannot be solved only by the photolysis technology, so researches about the biodegradation technology are continuously on being developed.

The biodegradable plastics comprise polymeric products of microorganism such as PHB(Poly-β-hydroxybutylate), polymers synthesized from the biochemicals produced by microorganisms and the natural polymer such as Chitin. But, these kinds of biodegradable plastics are not appropriate economically because the production cost is high, so the polymer wherein the starch and so forth is added into the general plastic was proposed.

U.S. Pat. No. 4,021,388 discloses a biodegradable plastic composition wherein the matrix resin and the starch are mixed. Further, U.S. Pat. Nos. 4,133,784 and 4,337,181 disclose methods for manufacturing biodegradable film by adding powdered starch into the ethylene-acrylic acid copolymer. But, these compositions have limitations on commercialization in that the production process becomes complicated and the production cost increases high because the starch or the modified starch is used for the biodegrading additives.

SUMMARY OF THE INVENTION

Accordingly, it is an object of the present invention is to provide a raw material composition for plastic molding product to minimize the problems of soil, air, and sea pollution caused by burial or incineration by manufacturing a biodegradable plastic composition having excellent physical properties and safety via simple process using biodegradable natural material, the rice powder and/or the corn powder that are easily acquirable.

To achieve the object mentioned above, the present invention provides a biodegradable plastic composition comprising 100 parts by weight of polyolefine matrix resin; and 5 to 400 parts by weight of grain powder selected from the group consisting of rice powder, corn powder and mixture thereof.

The plastic composition according to the present invention preferably contains 0.1 to 10 parts by weight of polyvinylalcohol as a biodegradation assistant to improve degradability of the composition and to prevent deterioration of the physical property caused by addition of the rice powder and/or the corn powder. Besides, 0.1 to 10 parts by weight of the coupling agent and 0.1 to 10 parts by weight of the plasticizer may be included to improve compatibility of the rice power and/or the corn powder with the matrix resin, and to improve simultaneously both physical properties and workability of the composition.

DETAILED DESCRIPTION OF THE PREFERRED EMBODIMENTS

The detailed description about the biodegradable plastic composition according to the present invention will be provided hereinafter.

The biodegradable plastic composition of the present invention comprises 5 to 400 parts by weight of the rice powder and/or the corn powder based on 100 parts by weight of the polyolefin matrix resin, preferably 30 to 80 parts by weight.

For the matrix resin, various resins, such as polyolefin resin, ethylenevinylacetate resin which is the copolymer of polyethylene with vinylacetate, polystyrene, ABS resin can be used in consideration of the property of the product, and it is preferable to use polyolefin resin such as polyethylene and polypropylene. For the polyethylene resin, HDPE(High Density Polyethylene), LDPE(Low Density Polyethylene), LLDPE(Linear Low Density Polyethylene) etc., may be used alone or in the form of mixtures thereof, and it is preferable to use HDPE(High Density Polyethylene) considering the physical property of the product, and the mixture in the ratio of 100~50: 30~0:20~0 corresponding to HDPE(High Density Polyethylene):LDPE(Low Density Polyethylene):LLDPE(Linear Low Density Polyethylene) respectively can be used in consideration of formability of the product.

Among the terms used for description of the present invention, the rice powder or the corn powder means not only the pulverized rice or corn themselves which can easily be obtained, but also the powdered form of the rice or corn treated by the commercial method such as foaming. The process for manufacturing plastic article can be simplified further in comparison with the process using the starch, a material treated once, or using the modified starch, a material treated twice because the composition of the present invention comprises the rice or the corn powder.

Especially, the rice powder makes it possible to manufacture products having excellent property in blending with the polyolefin resin compared with other types of grain. That is, the rice shows more excellent compatibility thanks to the attractive force worked on between the nonpolar materials when compounding with nonpolar polyolefin matrix resin because the rice contains less quantity of protein composed of polypeptide, fibroid material and polar lipid in comparison with other types of grain.

Further, since the rice contain much less quantity of riboflavin which is chemically unstable, the article manufactured with the plastic composition containing the rice shows much less possibility of discoloration compared with the article manufactured with the plastic composition containing other types of grain. And generally, the stability of the molded article manufactured by compounding the grain with the matrix resin is deteriorated due to its high hygroscopic property. But, the rice contains much more quantity of niacin which shows quite low hygroscopic property, so the stability of the molded article manufactured by compounding the rice powder with the matrix resin is fairly guaranteed.

According to the composition of the present invention, the diameter of the rice powder or the corn powder is preferably 10 to 2000 μm considering the shape and workability using the plastic composition.

Thus, if the molded article is manufactured with the plastic composition containing the rice powder and/or the corn powder, the pollution problems of soil, air and water can be minimized because it can be biodegraded by the microbes after a certain period and the efficiency of waste disposal can be improved.

According to the composition of the present invention, if 0.1 to 10 parts by weight of polyvinylalcohol as a biodegradation assistant is added, not only the biodegradability of the molded article composed of plastic composition can be improved due to the reaction of the hydroxy group of the hydrophilic polyvinylalcohol with water, but also deterioration of the physical property caused by addition of the rice powder and/or the corn powder can be prevented.

In addition, 0.1 to 10 parts by weight of the coupling agent may be further added to improve both general physical property of the molded product and the compatibility between polyolefin matrix resin and the rice and the corn powder. Preferably, silane binder of following Formula 1, isopropyl triisostrearoyl titanate and mixtures thereof may be used for the coupling agent.

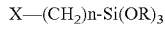  [Formula 1]

wherein X is one functional group selected from the group consisting of vinyl, amino, epoxy, methacryl and chloro, n is an integer ranging from 0 to 100, and OR is the methoxy or the ethoxy group.

Vinyltrimethoxysilane manufactured by Dow Corning Corp. is an example for the silane binder, and the silane binder may be input directly into the plastic composition. And, the wet method may be used. In this wet method, the silane binder is dissolved into aqueous methanol solution, and then the rice powder and/or the corn powder is added to react while agitating. In addition, the dry method may also be used. In this dry method, the silane binder is dissolved into a small amount of methanol, and after being mixed using the Littleford mixer, it is heated to polymerize thermally. The titanate binder is treated the same method that of the silane binder except using hexane instead of aqueous methanol solution.

Further, according to the composition of the present invention, 0.1 to 10 parts by weight of plasticizer may be added to improve the physical property, workability and film formability when forming sheet. For such plasticizer, one or more selected from the group consisting calcium stearate, zinc stearate, barium stearate, aluminium stearate, magnesium stearate, paraffin wax or polyethylene wax may be used.

Besides them, various additives may be included within the scope of the present invention. For example, surfactants may be included to improve the biodegradability and the physical properties, especially it is known that the nonionic surfactants accelerate the biodegradability more effectively than the anionic or the cationic surfactant. Further, as a biodegrading agent, unsaturated fatty acid and its derivatives, a kind of auto-oxidants, may be included. For such biodegrading agent, any material which can be transformed into peroxides on the contact with microbes such as bacteria, mould, enzyme to break down the carbon-carbon bond of the matrix resin, and which can be organized physically and chemically with the matrix resin, and which satisfies the biodegradability, and which can be used widely and commercially, may be used.

The biodegradable plastic composition described above can be used for the injection molding product, sheet molding and blow molding product. For example, polyolefin resin, rice powder and/or corn powder, polyvinylalcohol, chemical coupling agent, placiticizer is mixed in a certain ratio, and after being melted and extruded using twin screw extruder, it is pelletized with the pelletizer to produce injection molding product or sheet molding product using injection molder or sheet casting extruder.

EMBODIMENT

The detailed description of the present invention referring to the embodiments is provided hereinafter. However, the embodiments according to the present invention can be modified in various ways and should not be understood to be restricted to the embodiments described below. The embodiments of the present invention are provided to describe the present invention more clearly to a person who has standard knowledge in the art.

Embodiment 1

100 parts by weight of matrix resin composed of HDPE (Melt Index: 5.0), 100 parts by weight of rice powder having 200 to 300 μm of its particle diameter, 5 parts by weight of polyvinylalcohol, 1 part by weight of antioxidant and 1 part by weight of releasing agent was mixed and was melted at 150~170° C. for 3 to 4 minutes while mixing, then it was extruded under 140° C. to be formed in the pellet shape.

Embodiment 2 to 9

Compositions were manufactured in a similar manner to that of Embodiment 1 except that the components and their contents employed were as indicated in Table 1 below.

At following Table 1 and 2, the unit of content of the component is parts by weight.

[Table 1]

|  | Embodiment No. | | | | | | | | |
|---|---|---|---|---|---|---|---|---|---|
| Component | 1 | 2 | 3 | 4 | 5 | 6 | 7 | 8 | 9 |
| Matrix resin | 100 | 100 | 100 | 100 | 100 | 100 | 100 | 100 | 100 |
| Rice powder | 100 | 100 | 100 | 100 | 100 | 100 | 100 | | 50 |
| Corn powder | | | | | | | | 100 | 50 |
| Anti-oxidant | 1 | 1 | 1 | 1 | 1 | 1 | 1 | 1 | 1 |
| Releasing agent | 1 | 1 | 1 | 1 | 1 | 1 | 1 | 1 | 1 |
| Polyvinylalcohol | 5 | 5 | 5 | 5 | 5 | | | 5 | 5 |
| Cacium stearate | | 5 | | 5 | 5 | 5 | | 5 | 5 |
| Polyethylene wax | | | 5 | | | | 5 | | |
| Vinyltrimethoxy silane | | | | 2 | | | | | |
| Isopropyltriiso stearoyl titanate | | | | | 2 | | | | |

Embodiment 10 to 14

Compositions were manufactured in a similar manner to that of Embodiment 1 except that the components and their contents employed were as indicated in Table 2 below.

TABLE 2

|  | Embodiment No. | | | | |
|---|---|---|---|---|---|
| Component | 10 | 11 | 12 | 13 | 14 |
| Matrix resin | 100 | 100 | 100 | 100 | 100 |
| Rice powder | 50 | 70 | 100 | 150 | 230 |
| Polyvinylalcohol | 3.5 | 3.5 | 3.5 | 3.5 | 3.5 |
| Anti-oxidant | 1 | 1 | 1 | 1 | 1 |
| Releasing agent | 1 | 1 | 1 | 1 | 1 |

At table 2 above, the anti-oxidant is a hindered phenolic antioxidant (Manufacturer: Miwon Commercial Co., Ltd., Korea, Blend Name: ANOX 20) and the releasing agent is Y-200 purchased from Yeo-hwa Corp., Korea.

Biodegradable plastic compositions according to above embodiments were injected using injection molder at the condition of 180~190° C. and 500~600 psi to obtain samples having 3.26 mm of its thickness. The tensile strength, the tensile elongation and the shape of the samples were measured, and the results are indicated in the following Table 3 and Table 4.

The shape is estimated in three stages such as good, normal and bad in consideration of the color and contamination degree of the external appearance on the basis of following criteria. And after preparing chips and experimental samples having size of 100×100×5 mm and then spraying water on the surface of the chips and experimental samples, the biodegradability is estimated in three stages such as good, normal and bad in consideration of the degree of degradation on the basis of following criteria.

(1) Criteria for Estimating the Shape

Good: the composition can be transformed into a sample and there is no deformation caused by such as contamination with the additives.

Normal: the composition can be transformed into a sample but there is some deformation caused by such as contamination with the additives.

Bad: the composition is transformed badly into a sample.

(2) Criteria for Estimating the Biodegradability

Good: More than 50% of the total volume of the sample is degraded.

Normal: More than 30% of the total volume of the sample is degraded.

Bad: Less than 10% of the total volume of the sample is degraded.

TABLE 3

|  | Embodiment No. | | | | | | | | |
|---|---|---|---|---|---|---|---|---|---|
|  | 1 | 2 | 3 | 4 | 5 | 6 | 7 | 8 | 9 |
| Tensile Strength (kfg/mm$^2$) | 27.421 | 29.734 | 24.596 | 36.834 | 31.347 | 29.912 | 25.184 | 28.593 | 28.785 |
| Tensile elongation (%) | 24.5 | 26.8 | 21.7 | 32.1 | 30.9 | 27.1 | 26.9 | 27.2 | 26.9 |
| Shape | Good | Good | Good | Good | Good | Good | Good | Good | Good |
| Biodegradability | Good | Good | Good | Good | Good | Normal | Normal | Good | Good |

TABLE 4

|  | Embodiment No. | | | | |
|---|---|---|---|---|---|
|  | 10 | 11 | 12 | 13 | 14 |
| Tensile Strength (kfg/mm$^2$) | 48.555 | 40.171 | 27.021 | 23.830 | 20.022 |
| Tensile elongation (%) | 43.2 | 28.6 | 24.2 | 26.7 | 19.3 |
| Shape | Good | Good | Good | Good | Good |
| Biodegradability | Normal | Normal | Good | Good | Good |

Referring to Table 3 and 4, samples manufactured with the biodegradable plastic composition according to the present invention show good physical properties such as the shape, the tensile strength and the tensile elongation, and it can be well understood that the composition could be used for various products. Further, the composition can minimize the environmental problems such as soil, air, and sea pollution caused by burial or incineration of wastes of the product because the inventive material shows excellent biodegradability.

INDUSTRIAL APPLICABILITY

As described above, the biodegradable plastic composition according to the present invention can make the process for manufacturing biodegradable product be simpler in comparison with the process using the starch, a material treated once, or using the modified starch, a material treated twice since the composition comprises the rice or the corn powder. Especially, because the rice powder shows more excellent compatibility with polyolefin matrix resin and superior stability against color change and against water absorption, the molded product of the composition manufactured by being blended with polyolefin resin can be used more usefully than that of other types of grain. And the environmental problems of soil, air, and sea pollution caused by burial or incineration of wastes of the product can be minimized because the inventive material can be decomposed by microbes in the nature after a certain period.

What is claimed is:

1. A biodegradable plastic composition comprising 100 parts by weight of polyolefin matrix resin; and 5 to 400 parts by weight of grain powder selected from the group consisting of rice powder, corn powder and mixture thereof.

2. The biodegradable plastic composition according to claim 1, further comprising 0.1 to 10 parts by weight of polvinylalcohol.

3. The biodegradable plastic composition according to claim 2, further comprising 0.1 to 10 parts by weight of coupling agent and 0.1 to 10 parts by weight of plasticizer.

4. The biodegradable plastic composition according to claim 3, wherein said coupling agent comprises one selected from the group consisting of silane binder represented as following formula 1, isopropyl triisostearoyl titanate and mixtures thereof;

$$X-(CH_2)n-Si(OR)_3 \qquad \text{[Formula 1]}$$

wherein X is one functional group selected from the group consisting of vinyl, amino, epoxy, methacryl and chloro, n is an integer ranging from 0 to 100, and OR is the methoxy or the ethoxy group.

5. The biodegradable plastic composition according to claim 3, wherein said plasticizer comprises at least one selected from the group consisting of calcium stearate, zinc stearate, barium stearate, aluminium stearate, magnesium stearate, paraffin wax and polyethylene wax.

* * * * *